(12) United States Patent
Iu et al.

(10) Patent No.: US 10,850,545 B2
(45) Date of Patent: Dec. 1, 2020

(54) INKJET PRINTER CARTRIDGE

(71) Applicant: Hewlett-Packard Development Company, L.P., Spring, TX (US)

(72) Inventors: Kai-Kong Iu, San Diego, CA (US); Howard Doumaux, San Diego, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/336,722

(22) PCT Filed: Jan. 31, 2017

(86) PCT No.: PCT/US2017/015914
§ 371 (c)(1),
(2) Date: Mar. 26, 2019

(87) PCT Pub. No.: WO2018/143967
PCT Pub. Date: Aug. 9, 2018

(65) Prior Publication Data
US 2020/0247165 A1    Aug. 6, 2020

(51) Int. Cl.
| | | |
|---|---|---|
| B41M 5/00 | (2006.01) |
| C09D 11/328 | (2014.01) |
| B41J 2/175 | (2006.01) |
| C09D 11/14 | (2006.01) |
| B41J 29/393 | (2006.01) |

(52) U.S. Cl.
CPC ........ *B41M 5/0023* (2013.01); *B41J 2/17553* (2013.01); *B41J 29/393* (2013.01); *C09D 11/14* (2013.01); *C09D 11/328* (2013.01)

(58) Field of Classification Search
None
See application file for complete search history.

(56) References Cited

U.S. PATENT DOCUMENTS

| | | | |
|---|---|---|---|
| 6,149,719 A | 11/2000 | Houle |
| 6,221,137 B1 | 4/2001 | King et al. |
| 6,378,976 B1 | 4/2002 | Byers et al. |
| 7,419,537 B2 | 9/2008 | Fujii et al. |
| 8,998,396 B2 | 4/2015 | Katsuragi |
| 2005/0204955 A1 | 9/2005 | Nagashima et al. |
| 2012/0287206 A1 | 11/2012 | Fielder et al. |
| 2013/0176359 A1 | 7/2013 | Roberts et al. |
| 2013/0213440 A1 | 8/2013 | Ohta |

FOREIGN PATENT DOCUMENTS

| | | |
|---|---|---|
| WO | WO-03022589 A1 | 3/2003 |
| WO | WO-2013044991 A1 | 4/2013 |

OTHER PUBLICATIONS

International Search Report and Written Opinion for International Application No. PCT/US2017/015914 dated Oct. 5, 2017, 8 pages.

Primary Examiner — Alejandro Valencia
(74) Attorney, Agent, or Firm — HP Inc. Patent Department

(57) ABSTRACT

Herein is described an inkjet printer cartridge, comprising: a printhead having a flow path; a reservoir in fluid communication with the printhead flow path, the reservoir containing an inkjet ink composition; and a shipping fluid present in the printhead flow path, wherein the shipping fluid comprises: a fadable colorant; a carbohydrate; and a liquid vehicle. A method of performing a nozzle check for an inkjet printhead is also described.

12 Claims, 2 Drawing Sheets

INKJET PRINTER CARTRIDGE

BACKGROUND OF THE INVENTION

Inkjet printing takes aqueous inks from a reservoir of an ink cartridge and passes it through a printhead to be jetted onto the print substrate through a print nozzle. Typical inkjet cartridges comprise the reservoir and the inkjet, with the cartridge as a whole being a consumable which the customer replaces in its entirety once the reservoir is exhausted of ink.

Inkjet printhead manufacturers ideally perform a print nozzle health check prior to shipping, to ensure that the printhead is fully functional so that the customer is satisfied with the print quality from the outset. Previous methods of performing this print nozzle health check include the use of the same ink as will be used by the end consumer to perform the print nozzle check, though this can lead to problems with ink pigment sedimenting out in the printhead and nozzle during shipping and storage before purchase by the customer. An alternative method is to use "invisible" UV or IR fluorescent additives, to inspect test print patterns. These require the use of additional equipment in the form of radiation sources and fluorescence detectors, which in turn require appropriate personal protective equipment.

DETAILED DESCRIPTION

Figure 1:
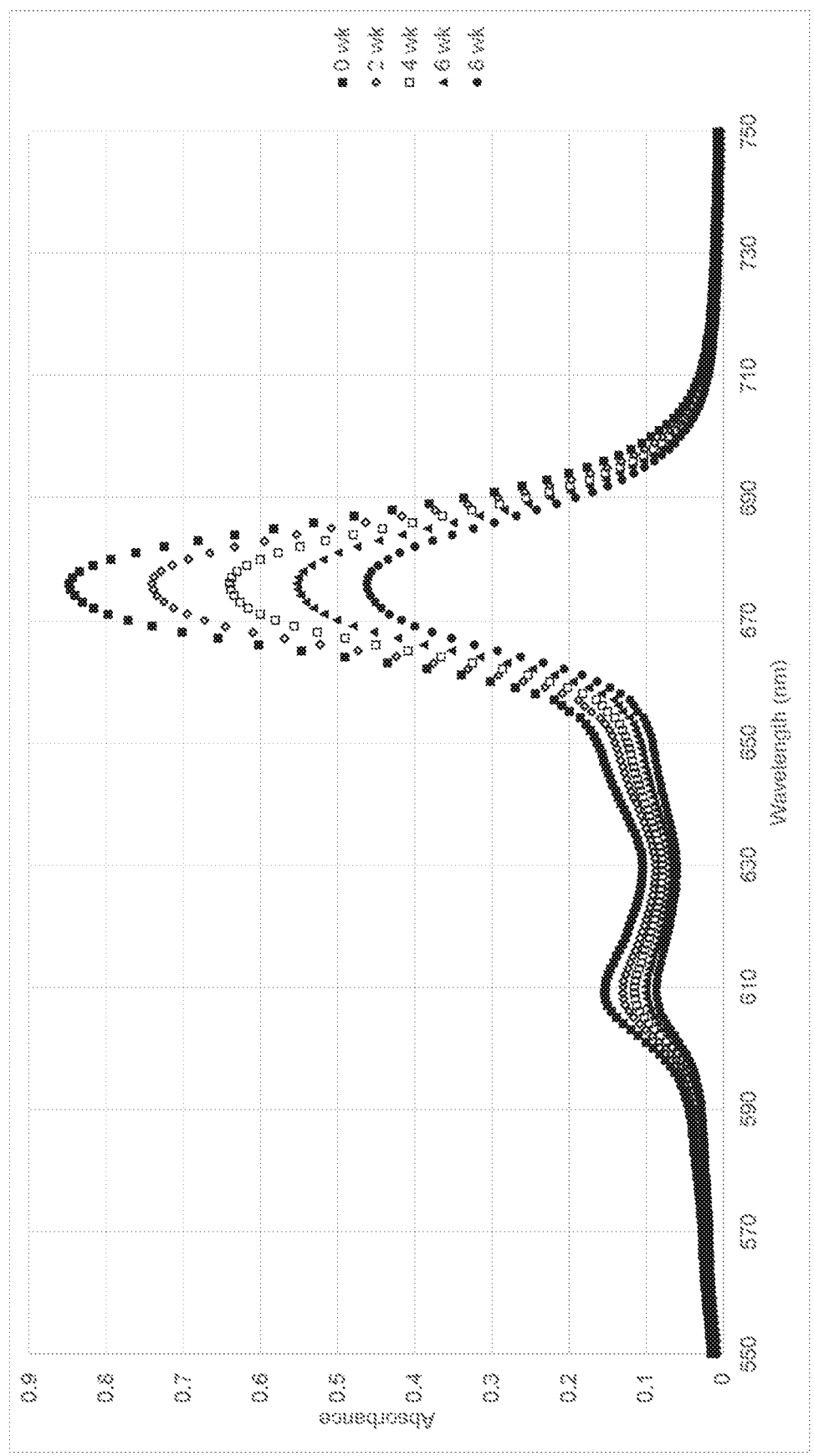
FIG. 1 shows the absorbance spectrum over time of an aluminium phthalocyanine dye with aging at 50° C.

Before the cartridges, compositions, methods and related aspects of the disclosure are disclosed and described, it is to be understood that this disclosure is not restricted to the particular process features and materials disclosed herein because such process features and materials may vary somewhat. It is also to be understood that the terminology used herein is used for the purpose of describing particular examples. The terms are not intended to be limiting because the scope is intended to be limited by the appended claims and equivalents thereof.

It is noted that, as used in this specification and the appended claims, the singular forms "a," "an," and "the" include plural referents unless the context clearly dictates otherwise.

If a standard test is mentioned herein, unless otherwise stated, the version of the test to be referred to is the most recent at the time of filing this patent application.

Unless otherwise stated, references herein to "wt %" of a component are to the weight of that component as a percentage of the whole composition comprising that component. For example, references herein to "wt %" of, for example, a solid material such as pigment or latex polymer dispersed in a liquid composition are to the weight percentage of those solids in the composition, and not to the amount of that solid as a percentage of the total non-volatile solids of the composition.

As used herein, the term "colorant" is used to describe a material that imparts a colour to its carrier, for example in the visible region of the electromagnetic spectrum such that the colour is detectible and discernible by the unaided eye under normal light. For example, the colorant may absorb certain wavelengths of visible light.

As used herein, the term "about" is used to provide flexibility to a numerical range endpoint by providing that a given value may be a little above or a little below the endpoint. The degree of flexibility of this term can be dictated by the particular variable.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Concentrations, amounts, and other numerical data may be expressed or presented herein in a range format. It is to be understood that such a range format is used merely for convenience and brevity and thus should be interpreted flexibly to include not just the numerical values explicitly recited as the end points of the range, but also to include all the individual numerical values or sub-ranges encompassed within that range as if each numerical value and sub-range is explicitly recited. As an illustration, a numerical range of "about 1 wt % to about 5 wt %" should be interpreted to include not just the explicitly recited values of about 1 wt % to about 5 wt %, but also include individual values and subranges within the indicated range. Thus, included in this numerical range are individual values such as 2, 3.5, and 4 and sub-ranges such as from 1-3, from 2-4, and from 3-5, etc. This same principle applies to ranges reciting a single numerical value. Furthermore, such an interpretation should apply regardless of the breadth of the range or the characteristics being described.

As used herein, the term "particle size" is a reference to the mean particle size by volume, as measured using laser diffraction techniques using diffractometers such as the Malvern Mastersizer, or Microtrac or Nanotrac diffractometers.

Unless otherwise stated, any feature described herein can be combined with any aspect or any other feature described herein.

The present inventors have found difficulties with performing a printhead nozzle print check prior to shipping of inkjet printer cartridges in a safe and efficient manner in a way that does not impact on the print quality of the first few print runs by the end customer, or require purging of a large amount of ink to obtain high purity colour from the printhead.

Shipping fluids are fluids present in the printhead to allow customers to install the printhead into the printer and immediately start printing. However, there are start-up issues around storing ink in the printhead. Such issues include discoloration of printed images due to residual ink in the printhead, or poor print quality due to plugging of the nozzles with ink pigment.

Therefore, the present inventors have sought to provide shipping fluids, and printheads comprising such fluids which enable methods of performing nozzle checks in a safe and efficient manner and which are in a condition suitable for shipping to a customer or retailer.

The present inventors have found that the certain water soluble colorants which emit IR-fluorescence become visible to the unaided eye with increasing concentration. Furthermore, the intensity of coloration under normal light of these water soluble dyes fades, with time and with temperature. Such dyes are therefore particularly suited for inclusion into a shipping fluid for a printhead as they allow a print nozzle check prior to shipping without any subsequent discoloration of the end customer's prints, yet do not require the use of external radiation sources and corresponding detection units as the colorant is visible under normal light.

In an aspect there is provided an inkjet printer cartridge, comprising: a printhead having a flow path; a reservoir in fluid communication with the printhead flow path, the reservoir containing an inkjet ink composition; and a shipping fluid present in the printhead flow path, wherein the shipping fluid comprises: a fadable colorant; a carbohydrate; and a liquid vehicle.

In a further aspect there is provided a method of performing a nozzle check for an inkjet printhead; comprising: priming the printhead with a test fluid comprising a fadable colorant; a carbohydrate; and a liquid vehicle; printing a test pattern onto a substrate; and visually inspecting the test pattern.

In a further aspect there is provided a shipping fluid for an inkjet printhead, comprising: a fadable colorant; a carbohydrate; and a liquid vehicle.

Inkjet Printer Cartridge

The present disclosure relates to an inkjet printer cartridge. The inkjet printer cartridge comprises a printhead having a flow path; a reservoir in fluid communication with the printhead flow path, the reservoir containing an inkjet ink composition; and a shipping fluid present in the printhead flow path, wherein the shipping fluid comprises: a fadable colorant; a carbohydrate; and a liquid vehicle as described herein.

In one example, the inkjet printer cartridge comprises a printhead having a flow path. The flow path connects a reservoir containing an inkjet composition to the print nozzle through which the inkjet composition is printed onto a media substrate during a printing process. In one example, the printhead flow path has a shipping fluid present in the flow path, the shipping fluid being as described herein. The structure of the printhead will vary depending on the type of inkjet printing apparatus in which the printhead is to be used and will not be discussed further.

In one example, the inkjet printer cartridge has a reservoir in fluid communication with the printhead flow path, with an inkjet ink composition contained within the reservoir. The inkjet ink composition may be any ink composition suitable for use on an inkjet printer. Examples of such compositions are described in U.S. Pat. Nos. 9,187,667, 8,783,842, 8,440,742, 8,267,505, 8,113,643, 8,114,923, 7,744,205, and 7,696,262, the contents of all of which are incorporated herein by reference.

Shipping Fluid

The shipping fluid described herein comprises a fadable colorant, a carbohydrate; and a liquid vehicle. The shipping fluid may further contain one or more surfactants, and additives such as biocides. All of these components will be described in turn below.

In one example, the shipping fluid has a dynamic viscosity greater than the dynamic viscosity of an inkjet ink composition intended to be printed using the printhead. In one example, the shipping fluid in the printhead has a dynamic viscosity greater than the dynamic viscosity of an inkjet ink composition present in the reservoir of the inkjet printer cartridge, Unless otherwise stated, references to dynamic viscosity herein are to dynamic viscosity as measured at 25° C. using an Anton Paar Rheometer or a CAP2000 rheometer from Brookfield Instruments.

In one example, the shipping fluid has a dynamic viscosity of at least about 2 centipoise (cP), for example at least about 2.5 cP, for example at least about 3 cP, for example at least about 4 cP, for example at least about 5 cP, for example at least about 6 cP, for example at least about 7 cP, for example at least about 8 cP, for example at least about 9 cP, for example at least about 10 cP, for example at least about 11 cP, for example at least about 12 cP, for example at least about 13 cP, for example at least about 14 cP, for example at least about 15 cP, for example at least about 16 cP, for example at least about 17 cP, for example about 18 cP.

In one example, the shipping fluid has a dynamic viscosity of less than about 18 centipoise (cP), for example less than about 17 cP, for example less than about 16 cP, for example less than about 15 cP, for example less than about 14 cP, for example less than about 13 cP, for example less than about 12 cP, for example less than about 11 cP, for example less than about 10 cP, for example less than about 9 cP, for example less than about 8 cP, for example less than about 7 cP, for example less than about 6 cP, for example less than about 5 cP, for example less than about 4 cP, for example less than about 3 cP, for example less than about 2.5 cP, for example about 2 cP.

In one example, the shipping fluid has a density greater than the density of an inkjet ink composition intended to be printed using the printhead. In one example, the shipping fluid in the printhead has a density greater than the density of the inkjet ink composition present in the reservoir of the inkjet printer cartridge.

In one example, the shipping fluid has a density of at least about 1.005 g/cm$^3$, for example at least about 1.01 g/cm$^3$, for example at least about 1.02 g/cm$^3$, for example at least about 1.03 g/cm$^3$, for example at least about 1.04 g/cm$^3$, for example at least about 1.05 g/cm$^3$, for example at least about 1.06 g/cm$^3$, for example at least about 1.07 g/cm$^3$, for example at least about 1.08 g/cm$^3$, for example at least about 1.09 g/cm$^3$, for example at least about 1.10 g/cm$^3$, for example at least about 1.11 g/cm$^3$, for example at least about 1.12 g/cm$^3$, for example at least about 1.13 g/cm$^3$, for example at least about 1.14 g/cm$^3$, for example at least about 1.15 g/cm$^3$, for example at least about 1.16 g/cm$^3$, for example at least about 1.17 g/cm$^3$, for example at least about 1.18 g/cm$^3$, for example at least about 1.19 g/cm$^3$, for example at least about 1.20 g/cm$^3$.

In one example, the shipping fluid has a density of less than about 1.20 g/cm$^3$, for example less than about 1.19 g/cm$^3$, for example less than about 1.18 g/cm$^2$, for example less than about 1.17 g/cm$^3$, for example less than about 1.16 g/cm$^2$, for example less than about 1.15 g/cm$^3$, for example less than about 1.14 g/cm$^2$, for example less than about 1.13 g/cm$^3$, for example less than about 1.12 g/cm$^3$, for example less than about 1.11 g/cm$^3$, for example less than about 1.10 g/cm$^3$, for example less than about 1.09 g/cm$^3$, for example less than about 1.08 g/cm$^3$, for example less than about 1.07 g/cm$^3$, for example less than about 1.06 g/cm$^3$, for example less than about 1.05 g/cm$^3$, for example less than about 1.04 g/cm$^3$, for example less than about 1.03 g/cm$^3$, for example less than about 1.02 g/cm$^3$, for example less than about 1.01 g/cm$^3$, for example about 1.005 g/cm$^3$.

In one example, the shipping fluid is substantially free of any organic polymer, non-soluble pigment or salts. The term "substantially free", will be understood to mean that any such component present in the composition is in a negligible amount and has no material effect on the composition.

Fadable Colorant

The shipping fluid for the inkjet printer cartridge comprises a fadable colorant. By the term fadable, it is meant that the concentration and intensity of the colorant decrease over time. In some examples, the concentration and intensity of the colorant decrease with temperature. In some examples, the concentration and intensity of the colorant decrease with time and with temperature. In some examples, the fadable colorant has a half-life of less than 70 days at 50° C., or a half-life of less than 20 days at 60° C. In some examples, the concentration and intensity of the colorant decrease naturally without exposure to light.

In some examples, the fadable colorant emits red to near-IR fluorescence when exposed to visible light. In some examples, the fadable colorant is present in the shipping fluid at a concentration such that it can be seen under normal light by the unaided eye. In other words, the fadable colorant is present in a concentration such that it emits light in the visible part of the electromagnetic spectrum. In some examples, the fadable colorant is visible to the unaided eye at a concentration of at least about 0.01 wt % of the total weight of the shipping fluid. In some examples, the fadable colorant is visible to the unaided eye at a concentration of at least about 0.1 wt % of the total weight of the shipping fluid. In some examples, the fadable colorant is present in an amount which is not visible to the unaided eye when printed on a substrate. In these examples, the fadable colorant is present in the shipping fluid in an amount sufficient for it to be detected via its near-IR fluorescence. Near-IR fluorescence of the shipping fluid printed onto a substrate can be detected using any known near-IR fluorescence detector such as a CCD or CMOS camera.

In some examples, the fadable colorant is present in the shipping fluid in an amount of at least about 0.01 wt %, based on the total weight of the shipping fluid, for example in an amount of at for example in an amount of at least about 0.05 wt %, for example in an amount of at least about 0.1 wt %, least about 0.2 wt %, for example in an amount of at least about 0.3 wt %, for example in an amount of at least about 0.4 wt %, for example in an amount of about 0.5 wt %, based on the total weight of the shipping fluid.

In some examples, the fadable colorant is present in the shipping fluid in an amount of less than about 0.5 wt %, based on the total weight of the shipping fluid, for example in an amount of less than about 0.4 wt %, for example in an amount of less than about 0.3 wt %, for example in an amount of less than about 0.2 wt %, for example in an amount of about 0.1 wt %, for example in an amount of about 0.05 wt %, for example in an amount of about 0.01 wt %, based on the total weight of the shipping fluid.

In one example, the fadable colorant is soluble in the liquid vehicle. In one example, the fadable colorant comprises a water soluble dye. In one example, the fadable colorant comprises a water soluble pigment. In some examples, the fadable colorant may be a cationic or anionic dye. Cationic dyes that may be used to advantage include azo compounds, diphenylmethane compounds, triarylmethane compounds, xanthene compounds, acridine compounds, quinoline compounds, methine compounds, polymethine compounds, thiazoles, indamines, indophenols, azine compounds, oxazine compounds and thiazine compounds. The selected cationic dye needs to have sufficient solubility in the liquid vehicle to produce the desired color intensity and avoid plugging of the print head during shipping. Examples of cationic water-soluble dyes include, but are not limited to, CI: Basic Violet 10, Basic Violet 11, Basic Violet 14, Basic Blue 3, Basic Blue 7, Basic Blue 9, Basic Yellow 11, Basic Yellow 28, Basic Yellow 37, and Basic Black 1.

Examples of anionic dyes commonly used in aqueous ink jet inks are the Acid, Direct, Food, Mordant, and Reactive dyes. Representative anionic dyes that may be used to advantage include nitroso compounds, nitro compounds, azo compounds, stilbene compounds, triarylmethane compounds, xanthene compounds, quinoline compounds, thiazole compounds, azine compounds, oxazine compounds, thiazine compounds, aminoketone compounds, anthraquinone compounds, indigo compounds and phthalocyanine compounds.

Examples of anionic water-soluble dyes include, but are not limited to, C.I. Food Black 2, C.I. Direct Black168, and C.I. Direct Black 22, C.I. Acid Red 18, C.I. Acid Red 27, C.I. Acid Red 52, C.I. Acid Red 289, C.I. Acid Yellow 23, and C.I. Direct Blue 199, C.I. Acid Blue 7, Acid Blue 9, Direct Blue 169, and their monovalent alkali ions such as $Na^+$, $Li^+$, $Cs^+$; and their $NH_4^+$, TMA (tetramethyl ammonium), and substituted ammonium salts.

In one example, the fadable colorant comprises a metal phthalocyanine dye. In one example, the fadable colorant comprises an aluminium phthalocyanine dye. In one example, the fadable colorant comprises a chloroaluminium phthalocyanine dye, and derivatives thereof. In one example, the fadable colorant comprises a chloroaluminium phthalocyanine tetrasulfonic acid dye and salts therefore, such as the Tinolux® BBS dye from BASF™. In one example, the fadable colorant fluoresces when exposed to IR light, even at concentrations at which it is no longer visible to the unaided eye under normal light.

Carbohydrate

The shipping fluid for the inkjet printer cartridge comprises a carbohydrate. As used herein, the term "carbohydrate" refers to polyhydroxy aldehydes and ketones, i.e. the class of biological molecules usually having an empirical formula of $C_m(H_2O)_n$ with glucose being one example. The carbohydrate is used to control the dynamic viscosity and the density of the shipping fluid, to ensure that one or both of the dynamic viscosity and density are greater than that of an inkjet ink composition intended to be printed using the printhead, for example an inkjet ink composition present in the reservoir of the inkjet printer cartridge.

In one example, the carbohydrate comprises a monosaccharide. In one example, the carbohydrate comprises a pentose or a hexose. In one example, the carbohydrate comprises a hexose selected from allose, altrose, glucose, mannose, gulose, idose, galactose, talose, psicose, fructose, sorbose and tagatose.

In one example, the carbohydrate comprises a disaccharide. In one example, the carbohydrate comprises a disaccharide selected from sucrose, lactose, maltose, and trehalose.

In one example, the carbohydrate comprises a synthetic, i.e. non-naturally occurring carbohydrate, such as sucralose (1',4,6'-trichlorogalactosucrose). In one example, the carbohydrate comprises a sugar alcohol obtained by reduction of any of the monosaccharides listed above, such as sorbitol, obtained by reduction of the aldehyde function of glucose to a primary hydroxyl group.

Sources of carbohydrate may include syrups such as corn syrup, barley malt syrup, molasses and invert syrup, also termed inverted or inverted sugar syrup. Suppliers of the above-mentioned monosaccharides and disaccharides include Sigma-Aldrich.

In one example, the carbohydrate is present in the shipping fluid in an amount of at least about 10 wt %, based on the total weight of the composition, for example at least about 15 wt %, for example at least about 20 wt %, for example at least about 25 wt % for example at least about 30 wt %, for example at least about 35 wt %, for example at least about 40 wt %, for example about 45 wt % of the total weight of the composition.

In one example, the carbohydrate is present in the shipping fluid in an amount of less than about 45 wt %, based on the total weight of the composition, for example less than about 40 wt %, for example less than about 35 wt %, for example less than about 30 wt %, for example less than about 25 wt %, for example less than about 20 wt %, for example less than about 15 wt %, for example about 10 wt % of the total weight of the composition.

In one example, the carbohydrate comprises sucrose in an amount of at least about 10 wt %, based on the total weight of the composition, for example at least about 15 wt %, for example at least about 20 wt %, for example at least about 25 wt %, for example at least about 30 wt %, for example at least about 35 wt %, for example at least about 40 wt % for example about 45 wt % of the total weight of the composition.

In one example, the carbohydrate comprises sucrose in an amount of less than about 45 wt %, based on the total weight of the composition, for example less than about 40 wt %, for example less than about 35 wt %, for example less than about 30 wt %, for example less than about 25 wt %, for example less than about 20 wt %, for example less than about 15 wt %, for example about 10 wt % of the total weight of the composition.

In one example, the carbohydrate comprises fructose in an amount of at least about 10 wt %, based on the total weight of the composition, for example at least about 15 wt %, for example at least about 20 wt %, for example at least about 25 wt %, for example at least about 30 wt %, for example at least about 35 wt %, for example at least about 40 wt %, for example about 45 wt % of the total weight of the composition.

In one example, the carbohydrate comprises fructose in an amount of less than about 45 wt %, based on the total weight of the composition, for example less than about 40 wt %, for example less than about 35 wt %, for example less than about 30 wt %, for example less than about 25 wt %, for example less than about 20 wt %, for example less than about 15 wt %, for example about 10 wt % of the total weight of the composition.

Surfactant/Other Additives

The shipping fluid for the inkjet printer cartridge may comprise a surfactant as are known by those skilled in the art of ink formulation. Non-limiting examples of such surfactants include alkyl polyethylene oxides, alkyl phenyl polyethylene oxides, polyethylene oxide block copolymers, acetylenic polyethylene oxides, polyethylene oxide (di)esters, polyethylene oxide amines, protonated polyethylene oxide amines, protonated polyethylene oxide amides, substituted amine oxides, polyethylene oxide alkyl sulfonates, polyethylene oxide alkyl sulfates, polyethylene oxide alkyl phosphates, and the like, as well as fluorocarbon and silicone surfactants. In one example, the surfactant comprises an acetylene glycol-based surfactant. In one example, the surfactant comprises an acetylene glycol-based surfactant such as one or more of Surfynol 104, 104E, 104H, 104A, 104BC, 104DPM, 104PA, 104PG-50, 104S, 420, 440, 465, 485, SE, SE-F, 504, 61, DF37, CT111, CT121, CT131, CT136, TG, GA, DF-110D, 82 (the above are all trade names produced by Air Products and Chemicals Inc), Olfine B, Y, P, A, STG, SPC, E1004, E1010, PD-001, PD-002W, PD-003, PD-004, EXP. 4001, EXP. 4036, EXP. 4051, AF-103, AF-104, AK-02, SK-14, AE-3, (the above are all trade names produced by Nissin Chemical Industry Co., Ltd.), Acetylenol E00, E00P, E40, E100, (the above are all trade names produced by Kawaken Fine Chemicals Co., Ltd.), and the like.

In addition to the above-mentioned components, the shipping fluid composition may include any number of buffering agents, biocides, sequestering agents, viscosity modifiers (in addition to the carbohydrates described above), humectants, stabilizing agents, and/or other known additives.

Liquid Vehicle

The shipping fluid for the inkjet printer cartridge comprises a liquid vehicle. In one example, the liquid vehicle comprises an aqueous liquid vehicle. In one example, the liquid vehicle comprises water. In one example, the liquid vehicle comprises water and one or more co-solvents, which may be miscible with water. In one example, the one or more co-solvents are selected from 2-pyrrolidone and alkyl alcohols such as 1,2-hexanediol, propylene glycol, 1,2-butanediol, and 1,3-butylene glycol. The amounts of any co-solvent present in the liquid vehicle may vary, but are typically less than about 5.00 wt % of the total weight of the composition.

Also described herein is a method of preparing a shipping fluid for an inkjet printhead, comprising: mixing a fadable colorant; a carbohydrate; and a liquid vehicle as described herein. In one example, the fadable colorant, the carbohydrate and the liquid vehicle are as described herein. In one example, the shipping fluid comprises one or more additives as described herein.

Method of Performing Nozzle Check

The present disclosure relates also to a method of performing a nozzle check for an inkjet printhead, the method comprising: priming the printhead with a test fluid comprising a fadable colorant; a carbohydrate; and a liquid vehicle; printing a test pattern onto a substrate; and visually inspecting the test pattern. In one example, the test fluid used in the method comprises or corresponds to the shipping fluid described herein.

By using the shipping fluid described herein, it is possible to perform the print nozzle health check using the shipping fluid and visually, without relying on external radiation sources and UV or IR detection units, ensure that all nozzles are jetting correctly. Furthermore, by using the shipping fluid described herein, it is not necessary to then flush out any residual fluid from the printhead. By the time that the inkjet printhead reaches the customer, the fadable colorant will have decayed or decomposed to the extent that any residual fluid in the printhead will not colour-contaminate an image printed by the user.

In one example, the method further comprises storing the printhead at elevated temperatures after printing of the test pattern, to accelerate the decomposition or decay of the fadable colorant, thereby decreasing the concentration and color intensity of the fadable colorant. In one example, the method further comprises storing the printhead at a temperature of about 60° C. for a period of two weeks after printing of the test pattern. In one example, the method further comprises storing the printhead at a temperature of about 60° C. for a period of one week after printing of the test pattern.

EXAMPLES

The following illustrates examples of the compositions and related aspects described herein. Thus, these examples should not be considered to restrict the present disclosure, but are merely in place to teach how to make examples of compositions of the present disclosure.

Shipping Fluid

A shipping fluid was prepared by stirring the composition as shown in Table 1 below for 30 minutes (with the balance being water):

TABLE 1

| | Component | wt % |
|---|---|---|
| Solvents | Tinolux ® BBS | 0.5% |
| | 2-Pyrrolidone | 5.00% |
| | High fructose corn syrup (Cornsweet 90) | 40.00% |
| Surfactants | Non-ionic fluorosurfactant | 0.50% |
| | Secondary alcohol ethoxylate | 0.50% |
| | Phosphate ester surfactant | 0.10% |
| Additives | Acticide ® M20 | 0.022% |
| | Acticide ® B20 | 0.044% |
| | TRIS | 0.20% |
| | FINAL pH | 8 |

Tinolux® BBS is available from BASF™ Cornsweet® 90 is a ~90% fructose syrup from ADM (with approximately 10% glucose and oligosaccharides); Capstone™ FS-35 is a non-ionic fluorosurfactant from DuPont™; Tergitol® 15-S-7 is a non-ionic surfactant from Sigma-Aldrich™; Crodafos™ N3 acid is a phosphate ester surfactant available from Croda Inc,™; and Acticide® M20 and Acticide® B20 are biocides available from Thor™.

Figure 2:
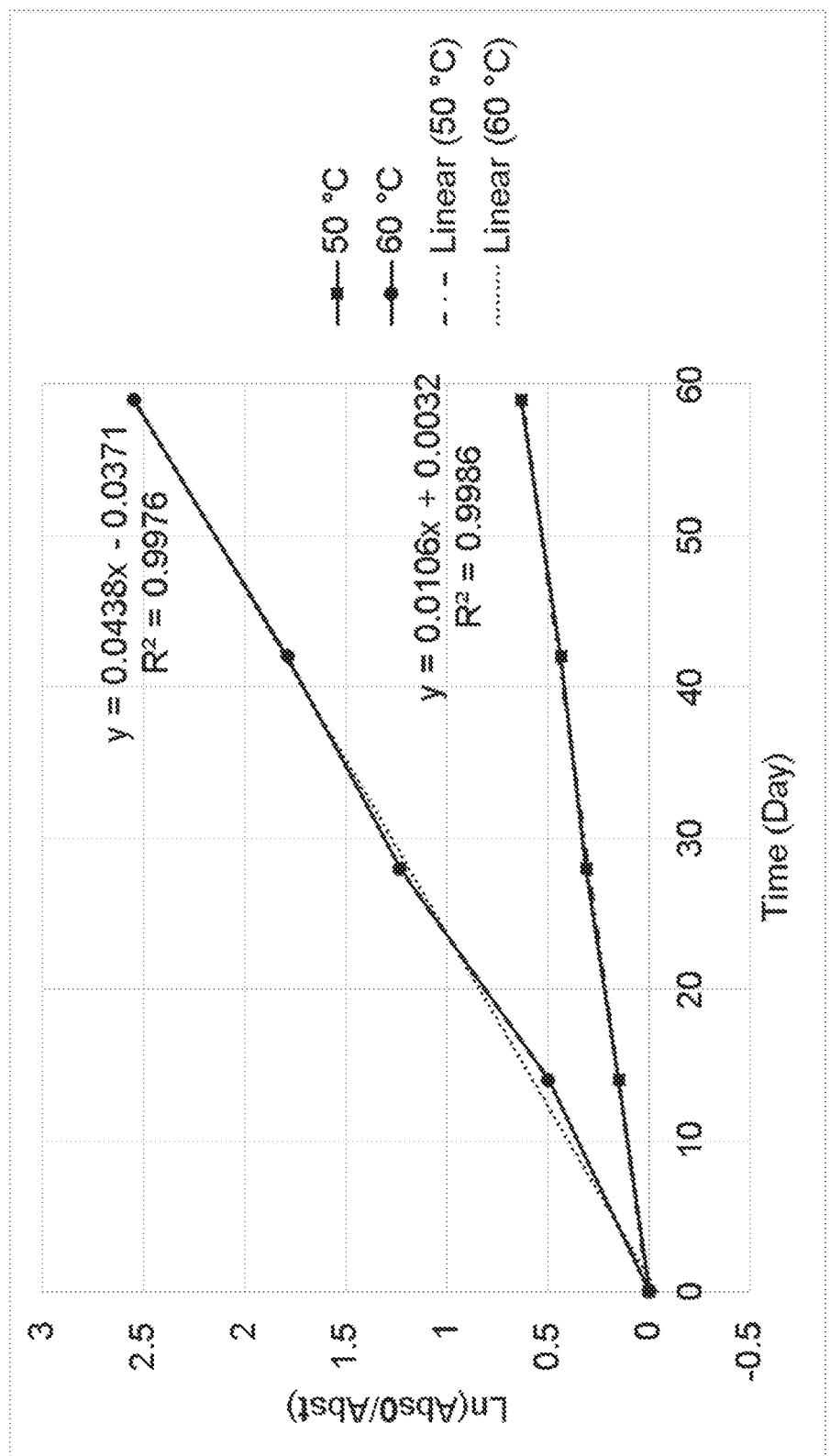
FIG. 2 shows the rate of decay and half-life of the same aluminium phthalocyanine dye.

The resultant composition is filtered through a 0.5 μm pore size filter to yield the shipping fluid. The shipping fluid is greenish-blue in colour, and can be used to perform print nozzle checks of an inkjet printhead prior to shipping. As can be seen in FIG. 1, over time, after aging at 50° C., the absorbance maximum of Tinolux® BBS (approximately 675 nm, so in the visible region of the electromagnetic spectrum) decreases. FIG. 2 shows the half-life of Tinolux® BBS at 50° C. and at 60° C., with the decay exhibiting first order kinetics, with the half-life calculated as being half-life=Ln 2/k=Ln 2/slope of the linear fit.

The above shipping fluid was print tested using 12 ng thermal printheads. The loading was found to give good visibility of the resultant print pattern to the unaided eye, allowing a visual check that all print nozzles were operational without the need for radiation sources and detectors. However, the color intensity of the shipping fluid decreases with age, as can be seen in FIG. 1 and FIG. 2, meaning that the color intensity of shipping fluid present in the printhead after testing will decrease during shipping and storage prior to reaching the consumer. By the time the consumer installs the cartridge, any residual coloration of the shipping fluid will be so low that it will not adversely affect the coloration of the consumer's print image.

While the cartridges, compositions, methods and related aspects have been described with reference to certain examples, it will be appreciated that various modifications, changes, omissions, and substitutions can be made without departing from the spirit of the disclosure. It is intended, therefore, that cartridges, compositions, methods and related aspects be limited only by the scope of the following claims. Unless otherwise stated, the features of any dependent claim can be combined with the features of any of the other dependent claims, and any other independent claim.

The invention claimed is:

1. An inkjet printer cartridge, comprising:
 a printhead having a flow path;
 a reservoir in fluid communication with the printhead flow path, the reservoir containing an inkjet ink composition; and
 a shipping fluid present in the printhead flow path, wherein the shipping fluid comprises:
  a fadable colorant present in an amount ranging from at least about 0.01 wt % to about 0.5 wt %, based on a total weight of the shipping fluid;
  a carbohydrate; and
  a liquid vehicle;
 wherein the shipping fluid in the printhead flow path has a dynamic viscosity greater than the dynamic viscosity of the inkjet ink composition in the reservoir.

2. An inkjet printer cartridge according to claim 1, wherein the concentration and intensity of the fadable colorant decrease over time.

3. An inkjet printer cartridge according to claim 1, wherein the fadable colorant is soluble in the liquid vehicle.

4. An inkjet printer cartridge according to claim 1, wherein the fadable colorant comprises a metal phthalocyanine dye.

5. An inkjet printer cartridge according to claim 1, wherein the fadable colorant comprises a chloroaluminium phthalocyanine dye or a derivative thereof.

6. An inkjet printer cartridge according to claim 1, wherein the carbohydrate comprises one or more of glucose, sucrose, sorbitol or fructose.

7. An inkjet printer cartridge according to claim 1, wherein the fadable colorant is visible to the unaided eye at a concentration of at least 0.2 wt % of the total weight of the shipping fluid.

8. An inkjet printer cartridge according to claim 1, wherein the fadable colorant emits red to near-IR fluorescence when exposed to visible light.

9. An inkjet printer cartridge according to claim 1, wherein the fadable colorant has a half-life of less than 70 days at 50° C.

10. An inkjet printer cartridge according to claim 1, wherein the fadable colorant has a half-life of less than 20 days at 60° C.

11. An inkjet printer cartridge according to claim 1, wherein the shipping fluid is substantially free of any dispersed pigment, polymeric material or salts.

12. An inkjet printer cartridge according to claim 1, wherein the shipping fluid in the printhead flow path has a density greater than the density of the inkjet ink composition present in the reservoir.

\* \* \* \* \*